United States Patent
Faulkner et al.

(10) Patent No.: US 7,849,691 B2
(45) Date of Patent: Dec. 14, 2010

(54) STEAM METHANE REFORMING WITH LNG REGASIFICATION TERMINAL FOR LNG VAPORIZATION

(75) Inventors: Jason W. Faulkner, Seabrook, TX (US); Dennis A. Vauk, Houston, TX (US); Eli E. Shaheen, Pearland, TX (US); Roland Clay Williams, Houston, TX (US); Terri L. Austin, Sugar Land, TX (US)

(73) Assignees: Air Liquide Process & Construction, Inc., Houston, TX (US); Air Liquide Large Industries U.S. LP, Houston, TX (US)

( * ) Notice: Subject to any disclaimer, the term of this patent is extended or adjusted under 35 U.S.C. 154(b) by 651 days.

(21) Appl. No.: 11/847,938

(22) Filed: Aug. 30, 2007

(65) Prior Publication Data

US 2008/0078177 A1    Apr. 3, 2008

Related U.S. Application Data

(60) Provisional application No. 60/827,978, filed on Oct. 3, 2006.

(51) Int. Cl.
*F01K 17/00* (2006.01)
(52) U.S. Cl. .......................................... 60/648; 60/649
(58) Field of Classification Search .................. 60/648, 60/649, 651, 671; 48/127.3, 127.5, 197 R
See application file for complete search history.

(56) References Cited

U.S. PATENT DOCUMENTS

| | | | |
|---|---|---|---|
| 2,996,458 A | 8/1961 | Whaley | |
| 3,241,933 A | 3/1966 | Ploum et al. | |
| 3,904,389 A | 9/1975 | Banquy | |
| 4,094,650 A | 6/1978 | Koh et al. | |
| 4,515,604 A | 5/1985 | Eisenlohr et al. | |
| 4,592,903 A * | 6/1986 | Osman et al. | 423/359 |
| 5,232,467 A * | 8/1993 | Child et al. | 48/127.3 |
| 6,248,794 B1 * | 6/2001 | Gieskes | 518/700 |
| 2003/0021743 A1 | 1/2003 | Wikstrom | |

FOREIGN PATENT DOCUMENTS

| | | |
|---|---|---|
| EP | 0044123 | 1/1982 |
| EP | 0200825 | 11/1986 |
| GB | 1573401 | 8/1980 |
| JP | 05287284 | 11/1993 |
| JP | 06184570 | 7/1994 |
| JP | 08092577 | 4/1996 |
| JP | 2003002601 | 1/2003 |

OTHER PUBLICATIONS

2nd Search Report for PCT/IB2007/002790.
Partial Search of PCT/IB2007/002790.

* cited by examiner

*Primary Examiner*—Hoang M Nguyen
(74) *Attorney, Agent, or Firm*—Elwood L. Haynes (57) ABSTRACT

Systems and methods for regasifying liquefied natural gas (LNG) are provided. The LNG is regasified by transferring heat from a steam methane reforming reaction to the LNG. In one embodiment, heat is transferred to the LNG from a synthesis gas produced in a steam methane reforming reaction. In another embodiment, heat is transferred to the LNG from a flue gas provided from a furnace heating a steam methane reforming reactor. By using excess heat from the steam methane reforming process, less energy may be consumed to regasify LNG.

28 Claims, 6 Drawing Sheets

STEAM METHANE REFORMING WITH LNG REGASIFICATION TERMINAL FOR LNG VAPORIZATION

CROSS-REFERENCE TO RELATED APPLICATIONS

This application claims the benefit under 35 U.S.C. §119(e) to provisional application No. 60/827,978, filed Oct. 3, 2006, the entire contents of which are incorporated herein by reference.

BACKGROUND

Natural gas (NG) generally refers to gaseous hydrocarbons (e.g., methane, ethane, propane, butane, and the like) which are found in the earth. NG is typically used as fuel or as an industrial feedstock.

Often, NG is extracted in one location and is transported to another location. In situations where NG must be transported across water, it is often chilled to convert it into liquefied natural gas (LNG), which requires much less volume than an equivalent amount of NG. The LNG is then typically transported in tanker vessels.

Once the LNG is delivered and unloaded at a LNG terminal facility, it is may be regasified back into NG. Once regasified, the NG may be used for a variety of applications, for example for distribution via a network of gas pipelines.

SUMMARY

Embodiments of the present invention generally relate to regasifying liquefied natural gas (LNG). In one embodiment, a method for regasifying LNG is provided. The method includes: receiving, from a steam methane reforming unit, a syngas comprising a mixture of hydrogen and carbon monoxide; and heating the LNG by heat exchange (either direct or indirect) with the syngas, such that at least a portion of the LNG is regasified to natural gas (NG).

In another embodiment, a method for regasifying LNG is provided. The method includes: receiving, from a gasification unit, a syngas comprising a mixture of hydrogen and carbon monoxide; and heating the LNG by heat exchange with the syngas, such that at least a portion of the LNG is regasified to natural gas (NG).

In yet another embodiment, a method for regasifying LNG is provided. The method includes: receiving, from a partial oxidation unit, a syngas comprising a mixture of hydrogen and carbon monoxide; and heating the LNG by heat exchange with the syngas, such that at least a portion of the LNG is regasified to natural gas (NG).

In yet another embodiment, an integrated system for regasifying liquefied natural gas (LNG) is provided. The integrated system includes: a steam methane reforming unit configured to generate syngas; and a heat exchanger configured for heat exchange between the syngas and a supply of LNG, such that at least a portion of the supply of LNG is regasified to NG.

In yet another embodiment, an integrated system for regasifying liquefied natural gas (LNG) is provided. The integrated system includes: a steam methane reforming unit configured to generate syngas; a furnace for heating the steam methane reforming unit, wherein the furnace produces flue gas; and a heat exchanger configured for heat exchange between the flue gas and a supply of LNG, such that at least a portion of the supply of LNG is regasified to NG.

BRIEF DESCRIPTION OF THE DRAWINGS

For a further understanding of the nature and objects of the present invention, reference should be made to the following detailed description, taken in conjunction with the accompanying drawings, in which like elements are given the same or analogous reference numbers and wherein.

DESCRIPTION OF PREFERRED EMBODIMENTS

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Generally, liquefied natural gas (LNG) is regasified to natural gas (NG) by application of heat. One method of generating such heat is by burning a portion of the NG as fuel. For example, the LNG may be regasified in submerged combustion vaporizers (SCVs), which use a tube bundle submerged in a water bath to vaporize the LNG. In a SCV, the water temperature is maintained by burning a portion of the NG throughput.

However, such methods of regasification may consume a significant portion of the NG available. For example, a given SCV may consume approximately 1.3% of the NG throughput as fuel. Such consumption of NG can represent a significant operating cost, and may thus decrease the profitability of operating a LNG terminal facility. Also, burning NG for regasification creates waste products such as pollutants and greenhouse gases (e.g., $CO_2$). Increasingly, environmental considerations make it is desirable to reduce emissions of such waste products, which may be achieved according to embodiments disclosed herein.

Embodiments of the present invention transfer excess heat from steam methane reforming (SMR) to LNG in order to regasify the LNG. In one embodiment, the excess heat is transferred via a syngas produced by the SMR process. In another embodiment the excess heat is transferred by a flu gas output by a furnace of the SMR system. In another embodiment, the excess heat is transferred via a combination of the syngas and the flue gas. Persons skilled in the art will recognize other embodiments within the scope of the present invention.

In one embodiment, NG is used as a feedstock to a steam methane reforming (SMR) process. The SMR process typically involves reacting methane from the NG with steam to produce synthesis gas ("syngas"), which consists primarily of hydrogen and carbon monoxide. The SMR reaction proceeds as follows:

$$CH_4+H_2O=>CO+3H_2$$

This reaction may take place in a SMR unit at high temperatures (e.g., 700-1100° C.) and high pressure. The reaction is equilibrium limited and is highly endothermic. The heat for the reaction may be provided by a furnace surrounding the burning a portion of the NG feedstock.

Embodiments of the present invention advantageously harness excess heat produced by the SMR process in order to regasify LNG. Additionally, by transferring excess heat from an output stream of the SMR process to LNG, embodiments of the present invention regasify LNG while also cooling the output stream. In this way, the embodiments of the present invention avoid having to cool the output stream by other means (which may otherwise have been necessary). In various embodiments, the output stream may be a syngas generated in the SMR unit and/or one or more flue gases (i.e., gases remaining after combustion) that exit a furnace the SMR unit.

Figure 1:
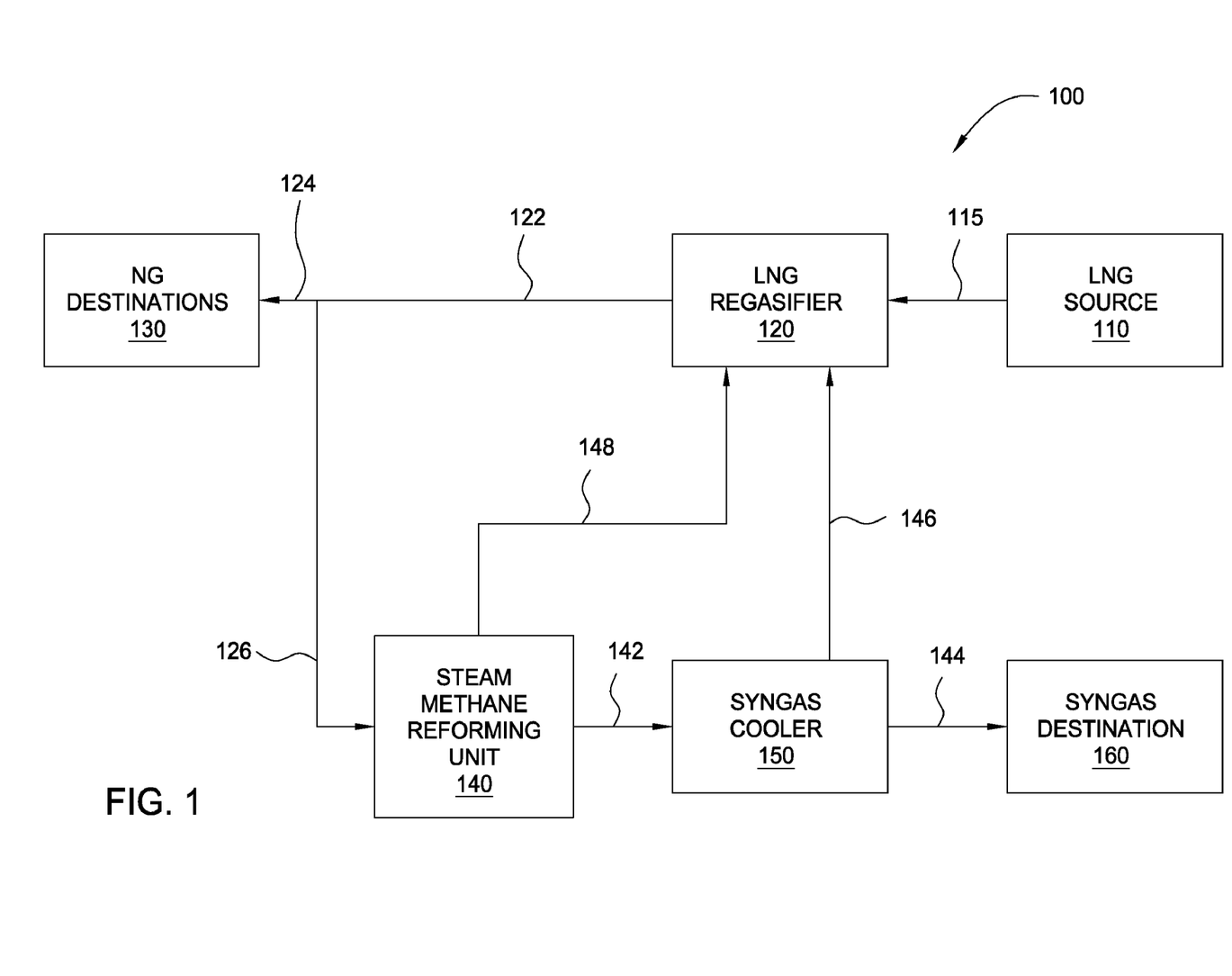
FIG. 1 is a process flow diagram of an integrated system for regasifying liquefied natural gas, according to one embodiment of the present invention.

FIG. 1 is a process flow diagram of an integrated system 100 for regasifying liquefied natural gas (LNG), according to one embodiment of the present invention. The integrated system 100 includes a LNG source 110, a LNG regasifier 120, a natural gas (NG) destination 130, a steam methane reforming (SMR) unit 140, a syngas cooler 150, and a syngas destination 160.

As shown, the LNG source 110 may provide a LNG supply 115 to the LNG regasifier 120. The LNG regasifier 120 may be configured to heat the LNG supply 115 so that it is regasified, resulting in NG supply 122. The NG supply 122 may be split into a NG feed 124 and a SMR feed 126. The NG feed 124 may be distributed to various destinations, represented here by NG destinations 130. Some examples of NG destinations 130 may include a storage vessel, a distribution pipeline, a tanker truck, etc.

Generally, NG is a mixture of hydrocarbon gases, consisting primarily of methane. In one embodiment, the SMR feed 126 may provide methane to the SMR unit 140, which may be configured to perform a SMR reaction. In a SMR reaction, methane and steam are reacted under heat and in the presence of a metal-based catalyst (e.g., Ni), resulting in a synthesis gas ("syngas") 142. The syngas 142 is a gas mixture composed primarily of hydrogen and carbon monoxide.

As the syngas 142 exits the SMR unit 140, it is typically at a high temperature (e.g., 1,000° C.) due to the heat of the SMR reaction. In some embodiments, the syngas 142 must be cooled before it can be used. Thus, syngas 142 is fed to the syngas cooler 150, which may be configured to cool the syngas 142 close to ambient temperature. The cooled syngas 144 may then be delivered to its destination, represented here by the syngas destination 160. Some examples of syngas destinations 160 may include a storage vessel, a purification process, a hydrocracking process, a hydrotreating process, an ammonia production process, a methanol production process, etc.

As shown, the heat removed from the syngas 142 by the syngas cooler 150 is illustrated by the recovered heat 146. The recovered heat 146 may be used by the LNG regasifier 120. The LNG regasifier 120 represents devices configured to vaporize LNG by application of heat energy. More specifically, the LNG regasifier 120 may represent a heat exchanger configured to transfer heat from a hot gas to a LNG feed, thus converting the LNG to NG.

In one embodiment, the LNG 115 may receive heat energy from the syngas 142. For example, the LNG regasifier 120 and the syngas cooler 150 may be configured as a single heat exchanger, thus serving to simultaneously cool the syngas 142 and heat the LNG 115. In another embodiment, the syngas cooler 150 may be configured to generate steam for use in the LNG regasifier 120. These embodiments are further discussed below with reference to FIGS. 2A-B.

Generally, the SMR reaction is endothermic, and thus requires the input of heat energy. This heat is typically provided by a furnace included in the SMR unit 140. In one embodiment, the furnace may surround a SMR reaction chamber included in the SMR unit 140, and may be configured to use a portion of the SMR feed 126 as fuel. The combustion gases of the furnace, represented by the flue gas 148, exit the furnace at a high temperature. In one embodiment, the flue gas 148 may be used in the LNG regasifier 120 to provide heat to the LNG 115. In another embodiment, the heat included in the flue gas 148 may be used to generate steam. The generated steam may then be used to provide heat to the LNG regasifier 120. These embodiments are further discussed below with reference to FIGS. 2C-D.

In one embodiment, the SMR unit 140 may be replaced in integrated system 100 by a unit configured to generate syngas by a process other than SMR. For example, syngas may be generated by a gasification process. Gasification is a process that converts carbonaceous materials, such as coal, petroleum, petroleum coke or biomass to syngas. Additionally, syngas may be produced by partial oxidation processes, for example thermal partial oxidation (TPOX) or catalytic partial oxidation (CPOX). Partial oxidation processes involve the partial combustion of a fuel-air mixture in a reformer. In both gasification and partial oxidation processes, syngas is produced at high temperatures. Thus, it is contemplated that integrated system 200 may be configured with a gasification unit or a partial oxidation unit instead of the SMR unit 140, with either type of unit providing syngas to the LNG regasifier 120.

Figure 2A:
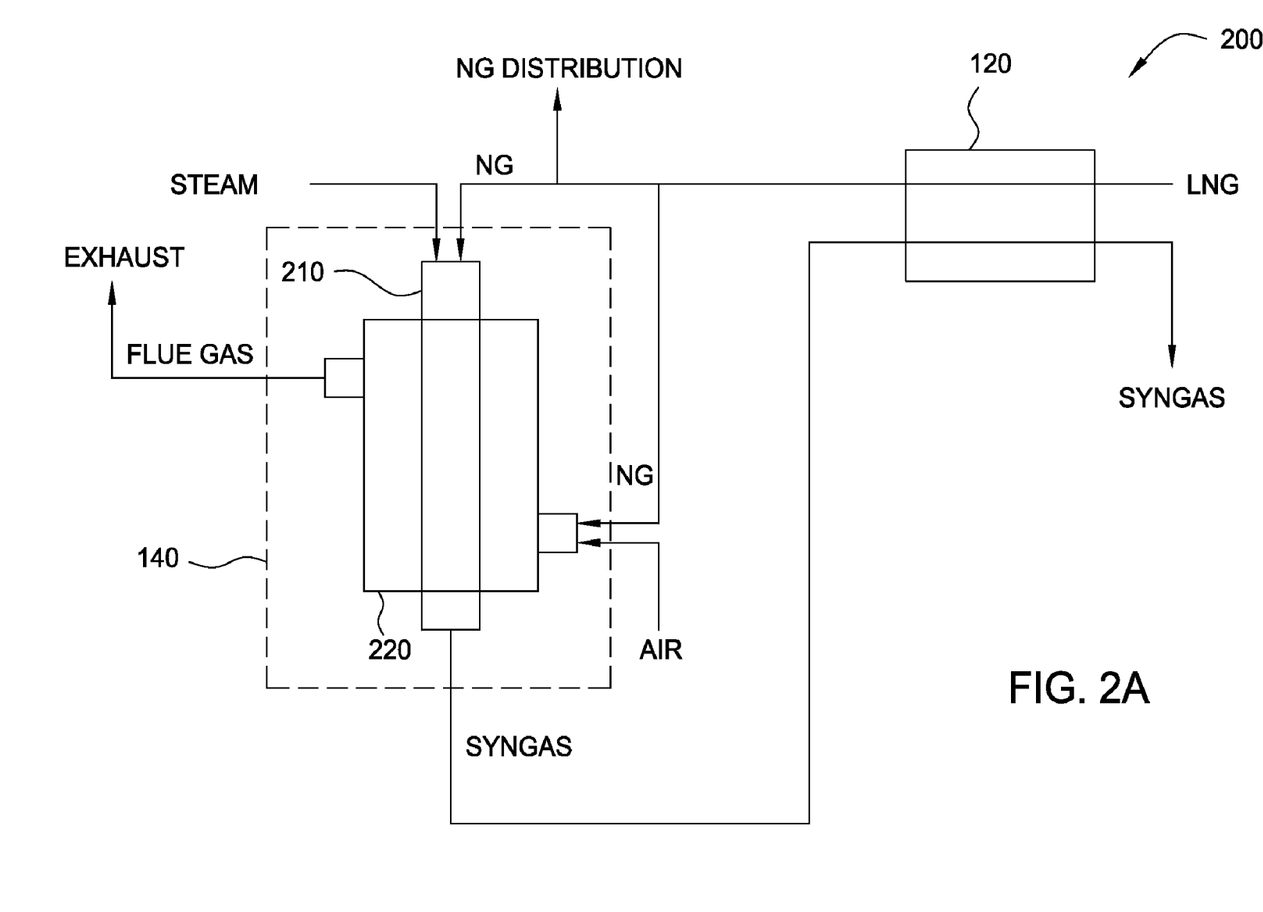
FIGS. 2A-2D are schematic diagrams illustrating aspects of an integrated system for regasifying liquefied natural gas, according to one embodiment of the present invention.

FIGS. 2A-2D are schematic diagrams of an integrated system 200 for regasifying liquefied natural gas, according to one embodiment of the present invention. As shown in FIG. 2A, the integrated system 200 includes a SMR unit 140, composed of a SMR chamber 210 and a furnace 220. The SMR chamber 210 may receive a mixture of steam and NG, and may be heated by the furnace 220. The methane included in the NG, when heated, reacts with the steam to produce syngas. The SMR chamber 210 may include a metal-based catalyst (e.g., Ni) to catalyze the SMR reaction. The furnace 220 receives a mixture of air and NG, burns the mixture, and exhausts a stream of flue gas.

The integrated system 200 also includes a LNG regasifier 120, which heats LNG to produce NG. Note that in this embodiment, the heat used by the LNG regasifier 120 is provided by the hot syngas exiting the SMR chamber 210. After being cooled in the LNG regasifier 120, the syngas may be used for other applications, or may be distributed to other locations.

Figure 2B:
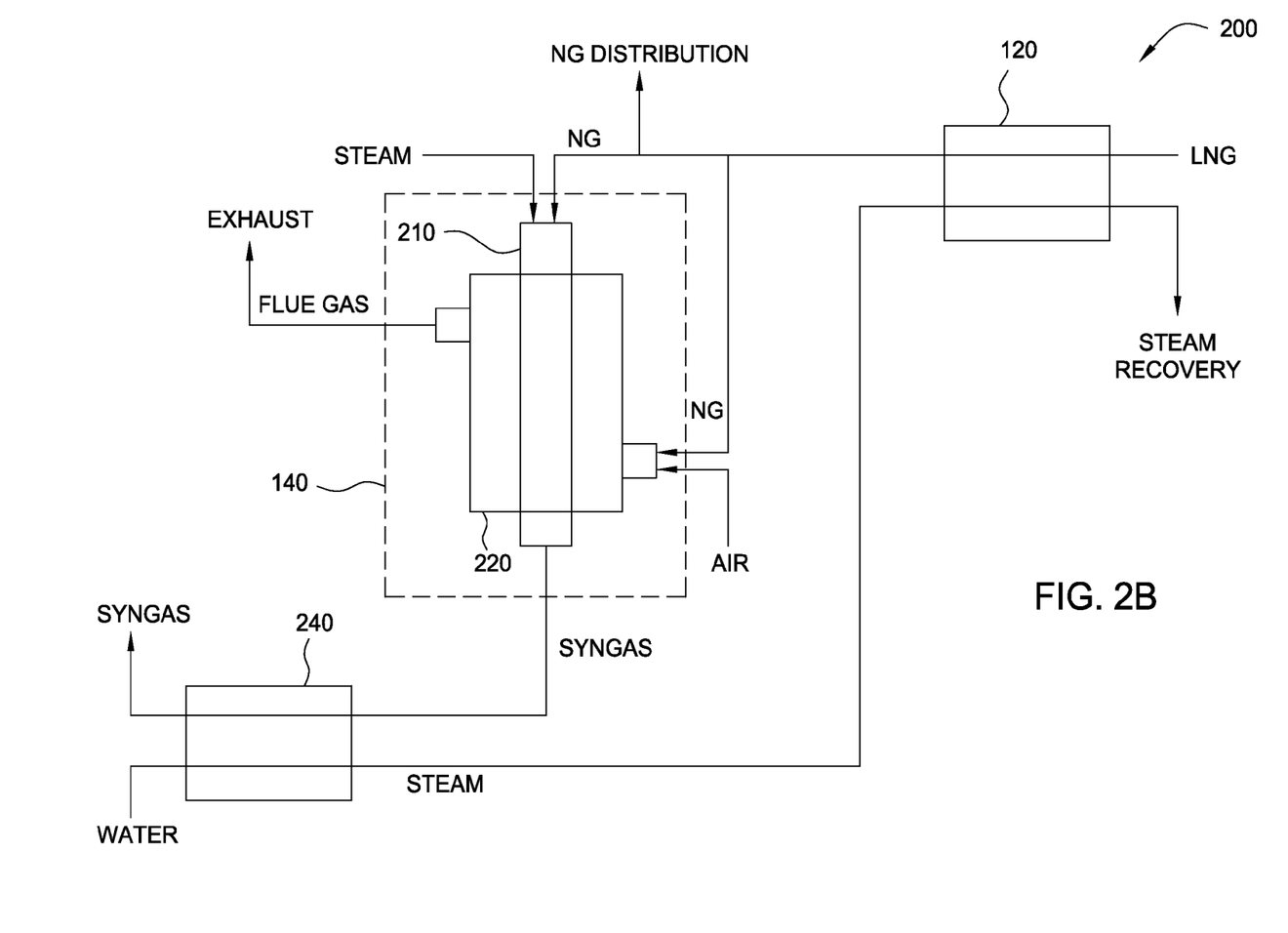

As illustrated in FIG. 2B, the integrated system 200 may also include a steam generator 240, which may be configured to use the heat of the syngas to convert water to steam. The generated steam may then be provided to the LNG regasifier 120. Note that in this embodiment, the heat of the syngas exiting the SMR chamber 210 is transferred to the LNG regasifier 120 by the generated steam. That is, the LNG regasifier 120 and steam generator 240 may be configured as a heat exchanging system to transfer heat from the syngas to the LNG. Additionally, it is contemplated that any excess steam (i.e., any steam that is not used by the LNG regasifier 120) may be used for other beneficial purposes (before or after passing through LNG regasifier 120). In one example, the excess steam may be used as feedstock to the SMR chamber 210. In another example, the excess steam may be used to preheat the air and/or NG feeds to the furnace 220, thus increasing the efficiency of the furnace. In yet another example, the excess steam may be fed to a steam turbine connected to an electric generator (not shown) in order to generate electricity. In one embodiment of the invention, steam is produced in the steam generator 240 at relatively high pressure (e.g., 200-2000 psig) and is passed through a turbine to generate electricity. After passing through the turbine, the steam is cooled and condensed by exchange with LNG regasifier 120 and recovered as liquid water at, for example, 1-4 psia, according to one embodiment. By using the heat of condensation of the steam to vaporize LNG, the heat duty applied to generating power may be lower than other forms of power generation where the heat of condensation is wasted by water cooling, thereby profitably utilizing the energy of the stream condensation.

Figure 2C:
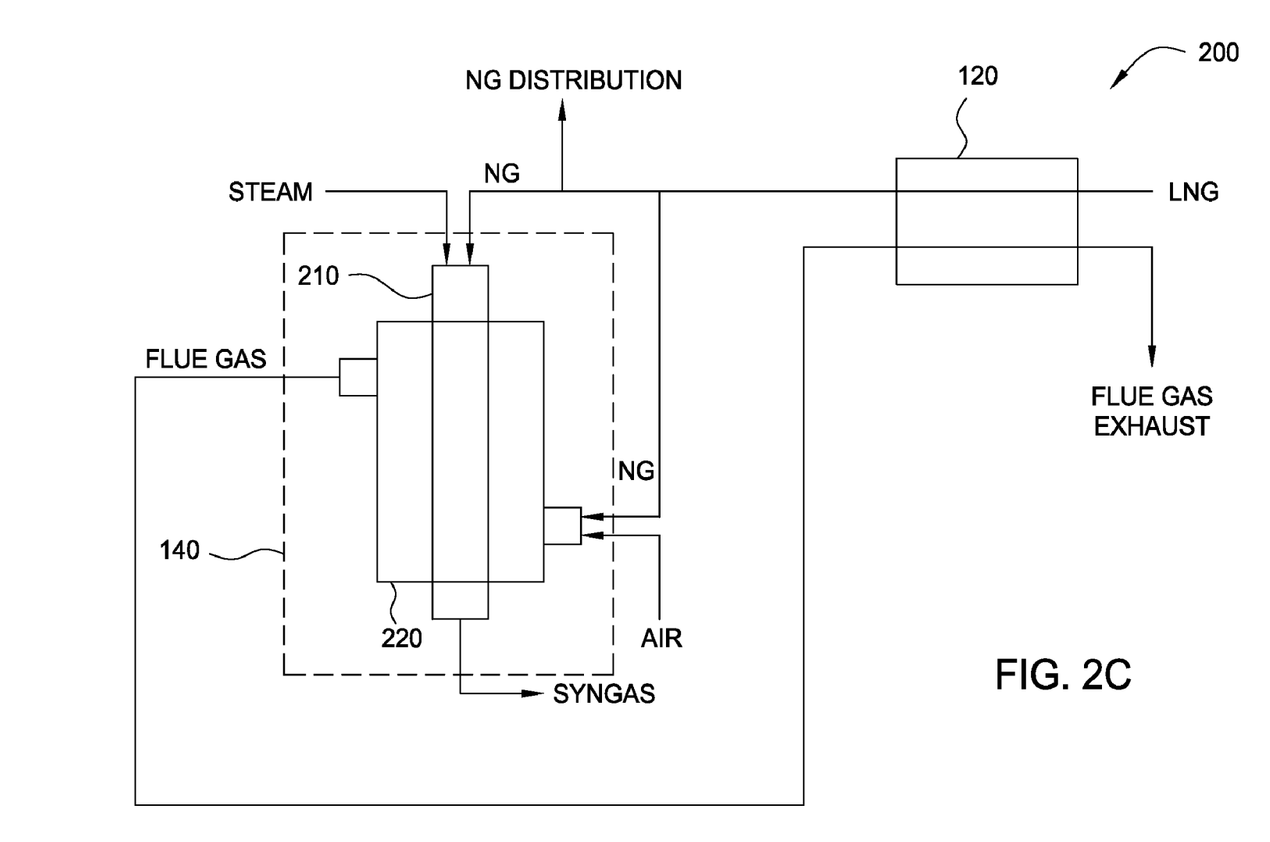
Figure 2D:
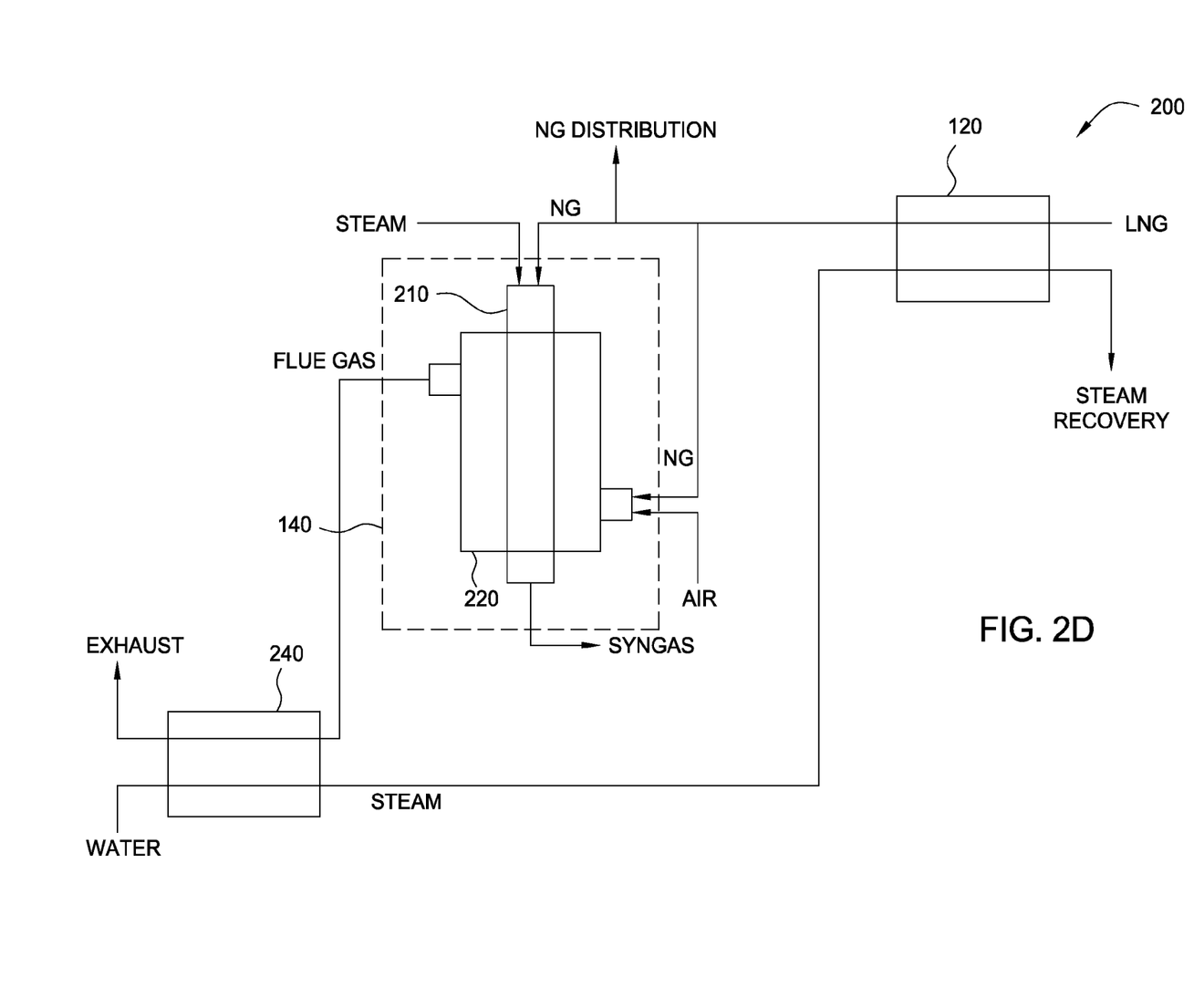

Referring now to FIG. 2C, the integrated system 200 may be configured so that the flue gas exiting the furnace 220 is fed to the LNG regasifier 120. Thus, in this embodiment, the heat used to regasify the LNG is provided by the hot flue gas. After exiting the LNG regasifier 120, the flue gas may be discharged to the atmosphere. Optionally, as illustrated in FIG. 2D, a steam generator 240 may be configured to use the heat of the flue gas to boil water, and thus generate steam. The generated steam may be provided to the LNG regasifier 120. Note that in this embodiment, the heat included in the flue gas is conveyed to the LNG regasifier 120 by the generated steam.

Of course, FIGS. 2A-2D are provided for illustrative purposes, and are not intended to be limiting of the scope of the invention. Other embodiments are broadly contemplated. For example, although the integrated system 200 is illustrated above as made up of separate components, it is contemplated that the functionality of various components may be provided by a single component.

Also, persons skilled in the art will recognize that the various embodiments described with respect to FIGS. 2A-D may be combined into an integrated embodiment. The integrated embodiment may include a system of valves and other devices under the control of a controller which operates to selectively place the integrated embodiment into various configurations, each configuration providing a different heat transfer mechanism corresponding to one of the embodiments (or combination of embodiments) of FIGS. 2A-D. For example, in a first configuration, excess heat is transferred from both the syngas and flue gas via a heat exchanger (e.g., LNG regasifier 120). Upon operation of the controller, the system is alternatively placed into second configuration in which excess heat is transferred from both the syngas and flue gas to steam, which then transfers heat to the LNG (corresponding to a combination of the systems shown in FIGS. 2B and 2D).

Other embodiments of the invention may utilize heavy hydrocarbons separated from the NG as feedstock to a steam reformer. Some sources of natural gas include significant amounts of heavy hydrocarbons, for example ethane, propane and butane. The natural gas from such sources may have a heating value above a specified value (e.g., 1000 btu/scf higher heating value). In order to produce a NG that meets the desired calorific specification, heavy hydrocarbons may be fractionated from the NG. In one embodiment, a LNG regasification plant may be configured to fractionate out the heavy hydrocarbons from the NG. The heavy hydrocarbons fractionated from the NG may be used as feedstock to a SMR for syngas production. The remaining NG stream, which now meets the desired calorific specification, may be exported to a NG pipeline, may be used to heat the SMR furnace, etc. Accordingly, such processes for heavy hydrocarbons can be applied to the embodiments disclosed herein providing the integration of a steam reformer with LNG regasification.

Figure 3:
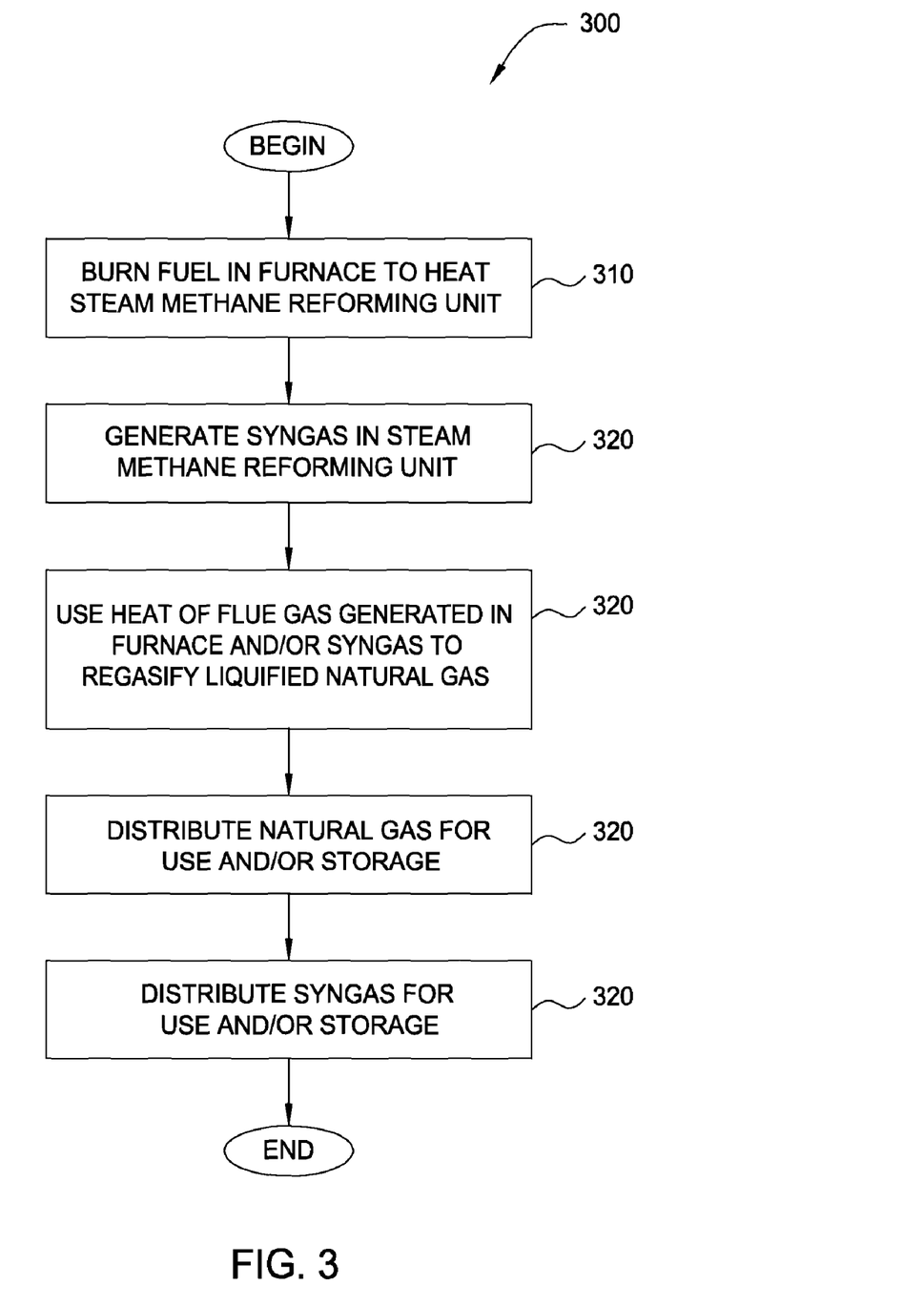
FIG. 3 is a flowchart of a method for regasifying liquefied natural gas, according to one embodiment of the present invention.

FIG. 3 is flowchart of a method 300 for regasifying liquefied natural gas (LNG), according to one embodiment of the invention. The method 300 begins at step 310, by combusting a mixture of fuel and air in a furnace to heat a steam methane reforming unit. For example, by combusting air and natural gas (NG) in the furnace 220 to heat the SMR chamber 210, as illustrated in FIGS. 2A-2D. This step also results in generating a flue gas, meaning waste gases of the combustion process.

At step 320, a synthesis gas ("syngas") is generated in the steam methane reforming unit. The generated syngas is a gas mixture, composed primarily of hydrogen and carbon monoxide. At step 330, the heat of the flue gas and/or the syngas may be used to regasify LNG, meaning to heat the liquid LNG so that it vaporizes to gaseous NG. More specifically, the flue gas and/or syngas may be used as a heat source in a heat exchanger configured to gasify LNG, according to one embodiment. For example, the LNG regasifier 120 illustrated in FIGS. 2A and 2C may be configured to transfer heat from the hot flue gas and/or syngas to the LNG. Alternatively, the flue gas and/or syngas may be used to generate steam, and the steam may then be used as a heat source in a heat exchanger configured to gasify the LNG. For example, the steam generator 240 may be used to generate steam for use in the LNG regasifier 120, as illustrated in FIGS. 2B and 2D.

At step 340, the NG resulting from regasifying the LNG at step 330 may be distributed for use and/or storage. For example, the NG may be used as a fuel for the furnace, used as a feedstock for the SMR process, distributed by pipeline, etc. At step 350, the syngas generated at step 320 may be distributed for use and/or storage. In one example, the syngas may be processed to purify and separate any component gases (e.g., hydrogen, carbon monoxide, etc.). Other examples include use as a feedstock for a hydrocracking process, for a hydrotreating process, to produce ammonia, to produce methanol, and the like.

According to embodiments of the present invention, several benefits may be provided by integrating a SMR process with a LNG regasification process. One benefit that may be achieved is the reduction (or elimination) of NG combusted for LNG regasification, thus making the LNG regasification more efficient, according to one embodiment. Another benefit that may be achieved is the reduction (or elimination) of combustion gases resulting from LNG regasification, thus reducing environmental impacts, according to one embodiment. Yet another benefit that may be achieved is the cooling of syngas, thus allowing the syngas to be distributed, stored, or used in further processes. These benefits may result from the recapture of excess heat in the synthesis gas and/or the flue gas produced in the SMR process.

Preferred processes and apparatus for practicing the present invention have been described. It will be understood and readily apparent to the skilled artisan that many changes and modifications may be made to the above-described embodiments without departing from the spirit and the scope of the present invention. The foregoing is illustrative only and that other embodiments of the integrated processes and apparatus may be employed without departing from the true scope of the invention defined in the following claims.

What is claimed is:

1. A method for regasifying liquefied natural gas (LNG), comprising:
   receiving, from a steam methane reforming unit, an output fluid selected from one of: (i) a syngas comprising a mixture of hydrogen and carbon monoxide, (ii) a flue gas from a furnace heating the steam methane reforming unit; and
   transferring heat from the output fluid to the LNG in order to heat the LNG, such that at least a portion of the LNG is regasified to natural gas (NG).

2. The method of claim 1, wherein the output fluid is the syngas and wherein transferring the heat comprises:
   flowing the syngas and the LNG through a heat exchanger.

3. The method of claim 1, wherein the output fluid is the syngas and wherein transferring the heat comprises:
   heating water by heat exchange with the syngas, such that at least a portion of the water is vaporized into steam; and
   heating the LNG by heat exchange with at least a portion of the steam, such that at least a portion of the LNG is regasified to NG.

4. A method for regasifying liquefied natural gas (LNG), comprising:
   receiving, from a steam methane reforming unit, an output fluid selected from one of: (i) a syngas comprising a mixture of hydrogen and carbon monoxide, (ii) a flue gas from a furnace heating the steam methane reforming unit; and
   transferring heat from the output fluid to the LNG in order to heat the LNG, such that at least a portion of the LNG is regasified to natural gas (NG) wherein the output fluid is the syngas and wherein transferring the heat comprises:
   heating water by heat exchange with the syngas, such that at least a portion of the water is vaporized into steam; and
   heating the LNG by heat exchange with at least a portion of the steam, such that at least a portion of the LNG is regasified to NG,
wherein a second portion of the steam is fed to the steam methane reforming unit.

5. The method of claim 3, wherein a second portion of the steam is fed to a steam turbine, and further comprising:
   generating electricity by means of an electric generator connected to the steam turbine, wherein the mechanical energy received by the electric generator is provided by the expansion of the remaining portion of the steam within the steam turbine.

6. The method of claim 1, wherein the output fluid is the flue gas and wherein transferring the heat comprises:
   flowing the flue gas and the LNG through a heat exchanger.

7. The method of claim 1, wherein the output fluid is the flue gas and wherein transferring the heat comprises:
   heating water by heat exchange with at least a portion of the flue gas, such that at least a portion of the water is vaporized into steam; and
   heating the LNG by heat exchange with at least a portion of the steam, such that at least a portion of the LNG is regasified to NG.

8. The method of claim 7, wherein a second portion of the steam is fed to the steam methane reforming unit.

9. The method of claim 7, wherein a second portion of the steam is fed to a steam turbine, and further comprising:
   generating electricity by means of an electric generator connected to the steam turbine, wherein the mechanical energy received by the electric generator is provided by the expansion of the remaining portion of the steam within the steam turbine.

10. The method of claim 7, wherein a second portion of the flue gas is used to preheat a supply of air fed to the furnace.

11. The method of claim 1, further comprising:
    mixing at least a portion of the NG with steam; and
    feeding the mixture of NG and steam to the steam methane reforming unit.

12. The method of claim 11, further comprising:
    feeding a second portion of the NG to the furnace; and
    combusting the second portion of NG within the furnace.

13. The method of claim 12, wherein a remaining portion of the NG is fed to a NG supply pipeline.

14. A method for regasifying liquefied natural gas (LNG), comprising:
    receiving a syngas from one of a gasification unit and a partial oxidation unit, wherein the syngas comprises a mixture of hydrogen and carbon monoxide; and
    transferring heat from the syngas to the LNG in order to heat the LNG, such that at least a portion of the LNG is regasified to natural gas (NG).

15. The method of claim 14, wherein transferring the heat comprises:
    flowing the syngas and the LNG through a heat exchanger.

16. The method of claim 14, wherein transferring the heat comprises:
    heating water by heat exchange with the syngas, such that at least a portion of the water is vaporized into steam; and
    heating the LNG by heat exchange with the steam, such that at least a portion of the LNG is regasified to NG.

17. An integrated system for regasifying liquefied natural gas (LNG), comprising:
    a steam methane reforming unit configured to generate syngas;
    a furnace for heating the steam methane reforming unit, wherein the furnace produces flue gas; and
    a heat exchanging system configured to transfer heat from at least one of (i) the syngas and (ii) the flue gas, to a supply of LNG such that at least a portion of the supply of LNG is regasified to NG.

18. The integrated system of claim 17, wherein the heat exchanging system comprises:
    a heat exchanger configured for heat exchange between the syngas and a supply of LNG, such that at least a portion of the supply of LNG is regasified to NG.

19. The integrated system of claim 17, wherein the heat exchanging system comprises:
    a steam generator configured to generate steam by heat exchange between the syngas and a supply of water; and
    a heat exchanger configured for heat exchange between the steam and a supply of LNG, such that at least a portion of the supply of LNG is regasified to NG.

20. The integrated system of claim 17, wherein the heat exchanging system comprises:
    a heat exchanger configured for heat exchange between the flue gas and a supply of LNG, such that at least a portion of the supply of LNG is regasified to NG.

21. The integrated system of claim 17, wherein the heat exchanging system comprises:
    a steam generator configured to generate steam by heat exchange between the flue gas and a supply of water; and
    a heat exchanger configured for heat exchange between the steam and a supply of LNG, such that at least a portion of the supply of LNG is regasified to NG.

22. The integrated system of claim 17, wherein at least a portion of the NG is fed to the steam methane reforming unit.

23. The integrated system of claim 22, wherein a second portion of the NG is fed to the furnace.

24. The integrated system of claim 23, wherein a remaining portion of the NG is fed to a NG supply pipeline.

25. A method for regasifying liquefied natural gas (LNG), comprising:
- regasifying the LNG at a regasification unit, to produce natural gas (NG);
- inputting at least a portion of the NG from the regasification unit to a steam methane reforming unit;
- receiving an output stream from the steam methane reforming unit; and
- transferring heat from the output stream to the LNG in the regasification unit in order to, at least in part, perform the regasifying.

26. The method of claim 25, wherein the output stream is at least one of (i) a syngas produced by the methane reforming unit and (ii) a flue gas produced by the methane reforming unit; and wherein transferring heat comprises transferring heat from at least one of the syngas and the flue gas to the LNG.

27. The method of claim 26, wherein transferring heat comprises:
- transferring heat from at least one of the syngas and the flue gas to steam; and
- transferring heat from the steam to the LNG.

28. A method for regasifying liquefied natural gas (LNG), comprising:
- receiving, from a steam methane reforming unit, an output fluid selected from one of: (i) a syngas comprising a mixture of hydrogen and carbon monoxide, (ii) a flue gas from a furnace heating the steam methane reforming unit; and
- transferring heat from the output fluid to the LNG in order to heat the LNG, such that at least a portion of the LNG is regasified to natural gas (NG), further comprising:
- fractionating one or more heavy hydrocarbons from the NG;
- mixing at least a portion of the one or more heavy hydrocarbons with steam; and
- feeding the mixture of heavy hydrocarbons and steam to the steam methane reforming unit.

* * * * *